(12) United States Patent
Juh et al.

(10) Patent No.: US 10,428,690 B2
(45) Date of Patent: Oct. 1, 2019

(54) VARIABLE POSITIONER

(71) Applicant: United Technologies Corporation, Hartford, CT (US)

(72) Inventors: Christopher M. Juh, South Windsor, CT (US); David J. Wasserman, Hamden, CT (US)

(73) Assignee: United Technologies Corporation, Farmington, CT (US)

( * ) Notice: Subject to any disclaimer, the term of this patent is extended or adjusted under 35 U.S.C. 154(b) by 1073 days.

(21) Appl. No.: 14/611,369

(22) Filed: Feb. 2, 2015

(65) Prior Publication Data

US 2015/0218965 A1 Aug. 6, 2015

Related U.S. Application Data

(60) Provisional application No. 61/934,871, filed on Feb. 3, 2014.

(51) Int. Cl.

| *F01D 25/16* | (2006.01) |
| *F02C 3/107* | (2006.01) |
| *F01D 5/02* | (2006.01) |
| *F02C 7/36* | (2006.01) |

(52) U.S. Cl.
CPC .............. *F01D 25/16* (2013.01); *F01D 5/025* (2013.01); *F01D 5/026* (2013.01); *F02C 3/107* (2013.01); *F02C 7/36* (2013.01); *F05D 2240/52* (2013.01); *Y02T 50/671* (2013.01); *Y10T 29/49238* (2015.01)

(58) Field of Classification Search
CPC ...... F01D 25/16; F01D 25/166; F01D 25/168; F01D 5/025; F01D 5/026; F02C 3/107; F02C 7/32; F02C 7/36; Y10T 29/49; Y10T 29/49229; Y10T 29/49236; Y10T 29/49238; F05D 2240/52; Y02T 50/671
USPC ....... 60/792; 415/170.1, 173.1, 173.2, 174.1, 415/126, 127, 128, 129, 131, 132
See application file for complete search history.

(56) References Cited

U.S. PATENT DOCUMENTS

| 1,570,002 | A | * | 1/1926 | Perry | ...................... F16B 39/32 411/327 |
| 3,188,807 | A | | 6/1965 | Rogers | |
| 3,402,750 | A | * | 9/1968 | Readman | ................ F01D 5/026 411/272 |
| 3,730,640 | A | * | 5/1973 | Rice | ......................... F01D 11/08 415/117 |
| 3,892,500 | A | | 7/1975 | Miller et al. | |

(Continued)

FOREIGN PATENT DOCUMENTS

| GB | 2057631 | 1/1981 |
| JP | 3865713 | 1/2007 |

OTHER PUBLICATIONS

European Search Report for corresponding European Patent Application No. 15153494.8 dated Jun. 23, 2015.

*Primary Examiner* — Phutthiwat Wongwian
*Assistant Examiner* — Loren C Edwards
(74) *Attorney, Agent, or Firm* — Carlson, Gaskey & Olds, P.C.

(57) ABSTRACT

A variable positioner includes a body portion with a cylindrical component, and an axially aligned through hole in the body position. A threading protrudes radially inward from an inner surface of the axially aligned through hole. A first axial end of the variable positioner defines an interface surface for interfacing with a rotor arm.

18 Claims, 3 Drawing Sheets

(56) References Cited

U.S. PATENT DOCUMENTS

| | | | |
|---|---|---|---|
| 3,997,962 A * | 12/1976 | Kleitz | B23P 19/06 |
| | | | 29/240 |
| 4,833,405 A | 5/1989 | Richards et al. | |
| 6,701,717 B2 * | 3/2004 | Flatman | F01D 5/146 |
| | | | 60/39.17 |
| 8,408,082 B2 | 4/2013 | Dahler et al. | |
| 2010/0124495 A1 | 5/2010 | Bifulco | |

\* cited by examiner

VARIABLE POSITIONER

CROSS-REFERENCE TO RELATED APPLICATION

This application claims priority to U.S. Provisional Application No. 61/934,871 filed on Feb. 3, 2014.

STATEMENT REGARDING GOVERNMENT SUPPORT

This invention was made with government support under Contract No. W911W6-08-2-0001 awarded by the United States Army. The Government has certain rights in this invention.

TECHNICAL FIELD

The present disclosure relates generally to a variable positioner for positioning a rotor relative to a shaft.

BACKGROUND

Gas turbine engines, such as those used on commercial and military aircraft, utilize multiple shafts to drive multiple compressor sections. Each of the shafts is connected to, and driven by, a turbine section. By way of example, some gas turbine engines include a high pressure turbine section that is connected to, and drives, a high pressure compressor section via a shaft and a low pressure turbine section that is connected to, and drives, a low pressure compressor section, a helicopter rotor, or another rotating component via another shaft. Alternate gas turbine engines can utilize additional compressor and turbine sections and an additional shaft.

In a typical gas turbine engine construction, the shafts are nested to form a single multi-shaft assembly that runs through the core of the gas turbine engine. This assembly is alternately referred to as a multi-spool assembly. Turbine rotors and compressor rotors corresponding to each shaft are attached to the shaft via a feature such as a spline which transfers torque between the rotors and the shaft. The rotors are maintained in axial position relative to the shaft via a spacer that interfaces with an axial load bearing feature on the shaft and with a shoulder of the rotor.

In some examples, gas turbine engine size and weight constraints reduce the possible size of the radially protruding shoulder. In such a case, the shoulder/spacer arrangement described above can be insufficient to maintain the rotor position relative to the static hardware forward and aft of the rotor.

SUMMARY OF THE INVENTION

A gas turbine engine according to an exemplary embodiment of this disclosure, among other possible things includes a compressor section having at least a first compressor portion and a second compressor portion, a combustor fluidly connected to the compressor section, a turbine section fluidly connected to the combustor section, the turbine section having at least a first turbine portion and a second turbine portion, a first shaft connecting the first compressor section and the first turbine section, a second shaft connecting the second compressor section and the second turbine section, the second shaft is at least partially disposed within the first shaft, and the second shaft includes a radially protruding threading portion, and a variable positioner disposed about the second shaft, the variable positioner includes a radially inward facing threading section, and the radially inward facing threading section of the variable positioner interfaces with the radially protruding threading portion of the second shaft.

In a further embodiment of the foregoing gas turbine engine, the variable positioner is a cylindrical component defining a radially outward facing surface and a first and second axial end surface.

In a further embodiment of the foregoing gas turbine engine, at least one of the first and second axial end surface of the variable positioner is an interface shoulder, and the interface shoulder interfaces with an interface surface of a rotating component, thereby maintaining the rotating component in position axially, relative to at least one static hardware component of the gas turbine engine.

In a further embodiment of the foregoing gas turbine engine, the variable positioner further includes at least one anti-rotation slot positioned on the radially outward facing surface, and the at least one anti-rotation slot interfaces with an anti-rotation feature of the rotor, thereby preventing rotation of the variable positioner relative to the second shaft.

In a further embodiment of the foregoing gas turbine engine, the at least one anti-rotation slot is loose fit with the at least one anti-rotation feature such that torque is transferred between the rotor and the second shaft at a spline instead of at the anti-rotation feature.

A further embodiment of the foregoing gas turbine engine includes a rotor having an interface surface contacting a surface of said variable positioner, the rotor including a rotor spline, the second shaft includes a shaft spline, and the rotor spline and the shaft spline are interfaced together allowing the transfer of torque between the shaft and the rotor.

In a further embodiment of the foregoing gas turbine engine, the variable positioner includes at least one anti-rotation slot and the rotor includes at least one corresponding anti-rotation feature, and the at least one anti-rotation slot and the at least one corresponding anti-rotation feature are interfaced to form an anti-rotation assembly.

In a further embodiment of the foregoing gas turbine engine, a clearance between an outer diameter of the second shaft and an inner diameter of the first shaft defines an outer diameter clearance to the second shaft.

In a further embodiment of the foregoing gas turbine engine, the radially protruding threading portion has a radial height, and the radial height is less than the outer diameter clearance of the second shaft.

A further embodiment of the foregoing gas turbine engine includes a power turbine section in fluid communication with the second turbine section and an output shaft, the power turbine section is connected to the output shaft via a third shaft, and the third shaft is disposed at least partially within the second shaft.

A variable positioner for a gas turbine engine according to an exemplary embodiment of this disclosure, among other possible things includes a body portion having a cylindrical component, an axially aligned through hole in the body portion, a threading protruding radially inward from an inner surface of the axially aligned through hole, and a first axial end defining an interface surface for interfacing with a rotor arm.

In a further embodiment of the foregoing variable positioner, the body portion further defines a radially outer surface, and the radially outer surface includes at least one anti-rotation slot.

In a further embodiment of the foregoing variable positioner, the at least one anti-rotation slot intrudes radially into the variable positioner.

In a further embodiment of the foregoing variable positioner, the at least one anti-rotation slot protrudes radially from the variable positioner.

In a further embodiment of the foregoing variable positioner, the at least one anti-rotation slot includes a plurality of anti-rotation slots disposed about the radially outer surface.

In a further embodiment of the foregoing variable positioner, the plurality of anti-rotation slots are disposed evenly circumferentially about the radially outer surface.

A method according to an exemplary embodiment of this disclosure, among other possible things includes disposing a variable positioner about a shaft, such that a radially inward facing threading of the variable positioner interfaces with a radially outward facing threading of the shaft, rotating the variable positioner, thereby shifting the variable positioner axially along the shaft, until an interface surface of the variable positioner is in a desired position, and interfacing a rotor with the interface surface of the variable positioner, thereby maintaining the rotor in an axial position relative to the shaft.

In a further embodiment of the foregoing method, includes interfacing an anti-rotation feature of the rotor with an anti-rotation slot of the variable positioner, thereby preventing rotation of the variable positioner relative to the shaft.

In a further embodiment of the foregoing method, includes interfacing a rotor spline portion with a shaft spline portion, thereby facilitating transfer of torque between the rotor and the shaft at a spline without incurring a transfer of torque between the rotor and the shaft at the variable positioner.

The foregoing features and elements may be combined in any combination without exclusivity, unless expressly indicated otherwise.

These and other features of the present invention can be best understood from the following specification and drawings, the following of which is a brief description.

DETAILED DESCRIPTION OF AN EMBODIMENT

Figure 1:
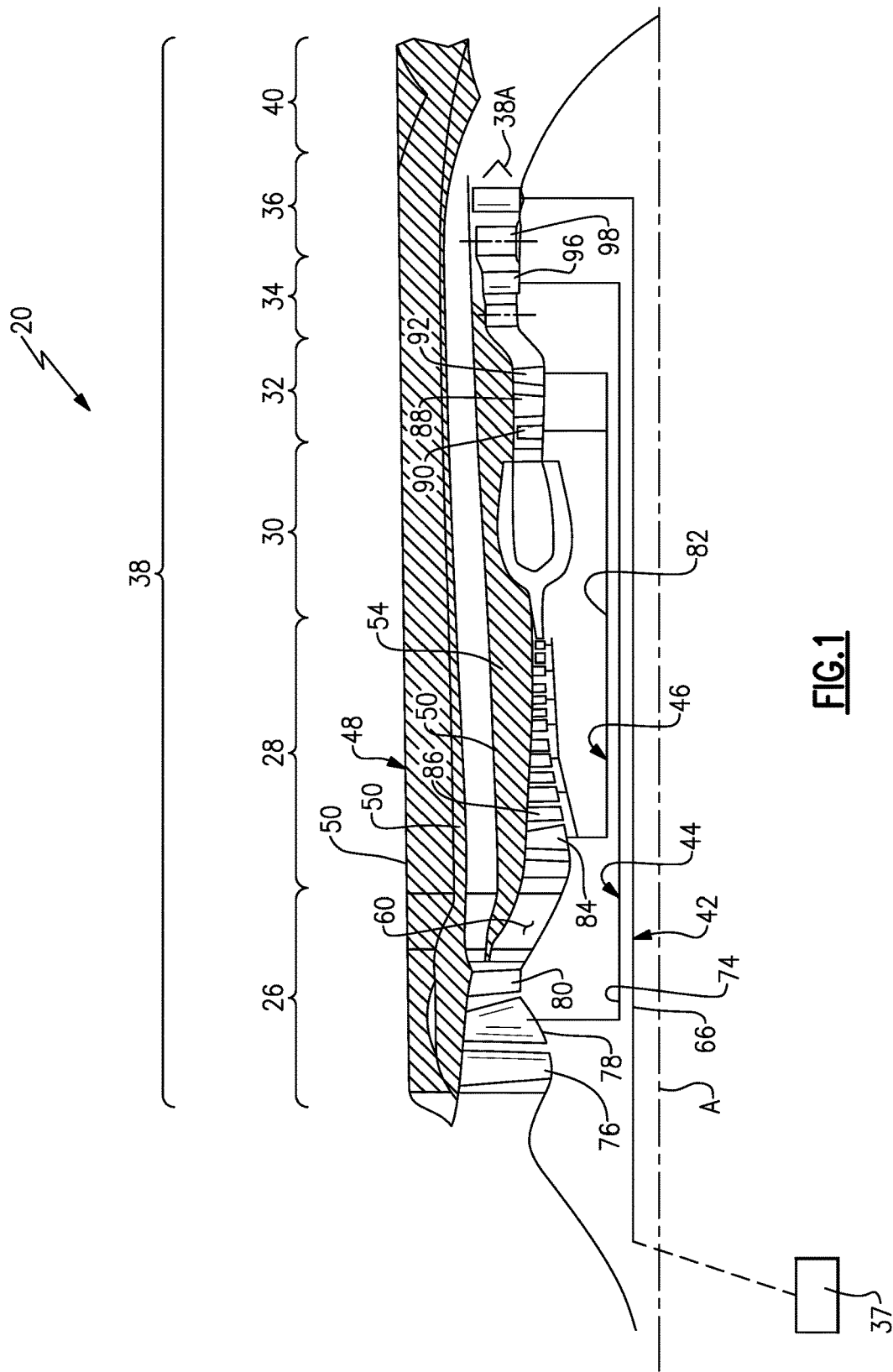
FIG. 1 schematically illustrates a gas turbine engine.

FIG. 1 schematically illustrates a gas turbine engine 20. The gas turbine engine 20 is disclosed herein as a variable cycle three-spool turbine that generally includes a low pressure compressor fan section 26, a high pressure compressor section 28, a combustor section 30, a high pressure turbine section 32, an low pressure turbine section 34, a power turbine section 36, a bypass duct section 38 and a nozzle section 40. The power turbine section 36 drives a helicopter rotor 37. Additional sections may include an augmentor section 38A among other systems or features such as a geared architecture which may be located in various other engine sections than that shown such as, for example, aft of the low pressure turbine section 34. The sections are defined along a central longitudinal engine axis A.

The engine 20 generally includes a power turbine spool 42, a low pressure turbine spool 44 and a high pressure turbine spool 46 which rotate about the engine central longitudinal axis A relative to an engine case structure 48. It should be appreciated that other architectures, such as a two-spool architecture, will also benefit therefrom.

It should further be understood that various structures individual or collectively within the engine may define a case structures 50 to define an exoskeleton that supports the spools 42, 44, 46 for rotation therein.

The low pressure compressor section 26 communicates low pressure compressor flow into the core flow path 60. The high pressure compressor section 28, the combustor section 30, the high pressure turbine section 32, the low pressure turbine section 34, and the power turbine section 36 are in the core flow path 60.

The core airflow is compressed by the low pressure compressor section 26, the high pressure compressor section 28, mixed and burned with fuel in the combustor section 30, then expanded over the high pressure turbine section 32, the low pressure turbine section 34, and the power turbine section 36. The turbines 32, 34, 36 rotationally drive the high pressure turbine spool 46, the low pressure turbine spool 44, and the power turbine spool 42 in response to the expansion. The power turbine section 36 is coupled to a power turbine shaft 66. In one example, the power turbine shaft 66 is coupled to a helicopter rotor and provides a rotational input to the helicopter rotor. In alternate examples, the power turbine shaft 66 is an output shaft that provides rotation to another system, such as an electrical generator.

In some instances a second stream bypass duct 54 is defined by an outer case structure 50 and the inner case structure 54. The core flow path 60 is generally defined by the inner case structure 54.

The low pressure compressor section 26 and the low pressure turbine section 34 are coupled by a low pressure turbine shaft 74 to define the low pressure turbine spool 44. In the example of FIG. 1, the low pressure compressor section 26 includes a low pressure compressor variable inlet guide vane 76, a low pressure compressor rotor 78, and a low pressure compressor stator 80. It should be understood that other gas turbine engine architectures may alternatively or additionally be provided such as various combinations of a fixed or variable low pressure compressor, variable inlet guide vane 76, and a fixed or variable low pressure compressor stator.

The high pressure compressor section 28 and the high pressure turbine section 32 are coupled by a high shaft 82 to define the high pressure turbine spool 46. In the example of FIG. 1, the high pressure compressor section 28 upstream of the combustor section 30 includes multiple of stages, each with a rotor 84 and vane 86.

The high pressure compressor section 28 may alternatively, or additionally, include other compressor section architectures that include additional or fewer stages each with or without various combinations of variable or fixed guide vanes. Furthermore, each of the turbine sections 32, 34, 36 may alternatively or additionally include other turbine architectures which, for example, include additional or fewer stages each with or without various combinations of variable or fixed guide vanes. The high pressure turbine section 32 in the example of FIG. 1, includes multiple stages with variable high pressure turbine guide vanes (high pressure turbine vanes) 88 between a first stage high pressure turbine rotor 90 and a second stage high pressure turbine rotor 92.

Essentially all flow from the low pressure compressor section 26 is communicated into the core flow path 60.

Due to the multi-shaft arrangement of the gas turbine engine 20, the power turbine spool 42 is contained within the low pressure turbine spool 44, and the low pressure turbine spool 44 is contained within the high power turbine spool 46. This arrangement of shafts 66, 74, 82 is referred to herein as a nesting arrangement.

During assembly of the gas turbine engine 20, the core is constructed first, and turbine shafts 66, 74 are installed. In one example, the low pressure turbine 34 is installed after low pressure shaft 74 and before the power turbine shaft 66 is installed. As a result of this assembly procedure, the low pressure turbine shaft 74 has a maximum outer diameter boundary defined by an internal radius of the high pressure turbine shaft 82. Similarly, the low pressure turbine shaft 74 has a minimum internal radius defined by the features of the power turbine shaft 66 that passes through the low pressure turbine shaft 74.

In a typical gas turbine engine, the low pressure turbine shaft 74 is connected to the rotors 96 in the low pressure turbine section 34 via a spline. The shaft 74 includes a shoulder that extends radially outward from the shaft and defines an axial positioning surface. The axial positioning surface of the shoulder interfaces with a spacer component that is disposed about the shaft 74. The spacer component in turn interfaces with a feature of the low pressure turbine rotor to maintain the rotor in position axially. Existing spacer components come in classified sizes and are machined to particular tolerances once the specific spacing needed for a given engine is determined.

In an engine 20 where the outer diameter bound of the low pressure turbine shaft 74 is small due to height and/or weight constraints, the maximum possible radial height of the outer diameter shoulder can be too small to sufficiently prevent axial motion of the low pressure turbine section rotor 96 without damage occurring to the shoulder. Therefore, the typical design cannot maintain the required axial position of the low pressure turbine rotor 96 when the engine 20 is under strict height/weight constraints.

Figure 2:
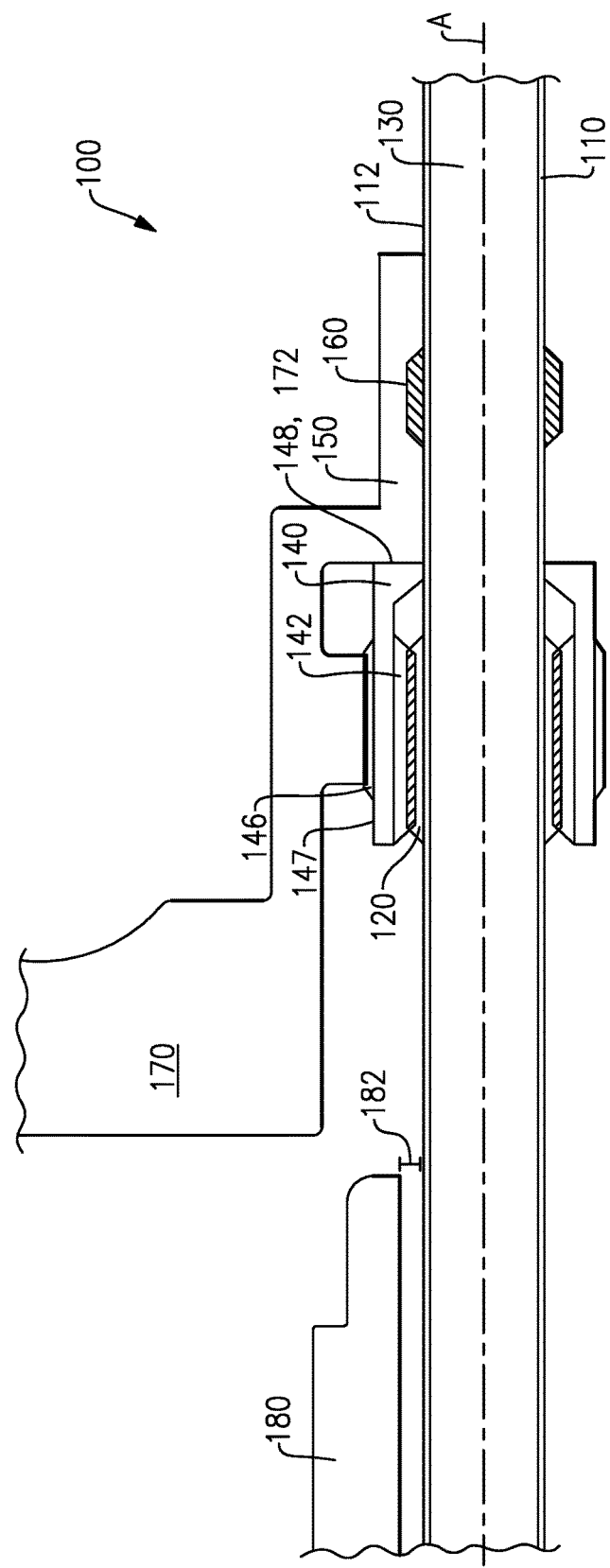
FIG. 2 is a partial schematic side view of a shaft for the gas turbine engine of FIG. 1.

FIG. 2 is a partial schematic side view of a low pressure turbine shaft 100 that can be used as the low pressure turbine spool 44 for the gas turbine engine 20 of FIG. 1. The low pressure shaft 100 includes a shaft body 110 that can be cylindrical in nature and is aligned with the axis A. The shaft body 110 includes an internal opening 130 for receiving a power turbine shaft (not pictured). A high power turbine shaft 180 surrounds the low pressure turbine shaft 100 and defines an outer diameter clearance 182 that any radially protruding features of the low pressure turbine shaft 100 must be able to pass through. As a result of the narrow outer diameter clearance 182, there is insufficient radial clearance for a shoulder/spacer arrangement such as the one described above.

The shaft body 110 includes a radially protruding threading section 120 with a radial height shorter than the outer diameter clearance 182. Disposed about the shaft body 110, is a variable positioner 140. The variable positioner 140 includes a section of radially inward facing threads 142. The radially inward facing threads 142 of the variable positioner 140 and the radially outward facing threads 120 of the shaft body 110 interface with each other. The axial position of the variable positioner 140 relative to the shaft body 110 can be adjusted via rotating the variable positioner 140 circumferentially about axis A, thereby causing the variable positioner 140 to shift axially via the threading interface.

In some examples, such as the illustrated example, the variable positioner 140 further includes one or more anti-rotation slots 146 on a radially exterior surface 147 of the variable positioner 140. While illustrated as a radial protrusion receiving a feature of a rotor 170 in the illustrated example, the anti-rotation slots 146 can, in alternate examples, be radial intrusions into the body of the variable positioner 140.

The variable positioner 140 further includes a shoulder surface 148 that interfaces with a facing shoulder surface 172 of the rotor 170. The contact between the facing shoulder surface 172 and the shoulder surface 148 of the variable positioner 140 maintains the rotor 170 assembly in the correct axial position relative to the static hardware forward and aft of the rotor 170. As described above, the axial position of the variable positioner 140 can be adjusted, relative to the shaft body 110, by rotation of the variable positioner 140. In this way, the specific position of the rotor 170 can be adjusted to compensate for tolerances of the specific engine without requiring milling or other alterations to a stock variable positioner 140.

Also protruding radially outward from the shaft body 110 is a shaft spline interface 160. The shaft spline interface 160 interfaces with a rotor spline interface of a rotor arm 150 of the rotor 170 and allows for the transference of torque from the shaft body 110 to the rotor 170, or vice-versa. In some examples, the anti-rotation slots 146 is a loose fit with the rotor 170, thereby allowing the anti-rotation slots 146 to prevent the variable positioner 140 from rotating, without imparting a torque transfer between the shaft body 110 and the rotor 170 at the anti-rotation slots 146. In alternate examples, the anti-rotation slots 146 are replaced by any other appropriate anti-rotation devices or features.

Furthermore, the shaft body 110 can include additional radially protruding features (not pictured). Each of the additional radially protruding features has a radial height less than the inner diameter bound 182, where the radial height is defined as the radial distance that the feature extends away from an outer surface 112 of the shaft body 110.

Figure 3A:
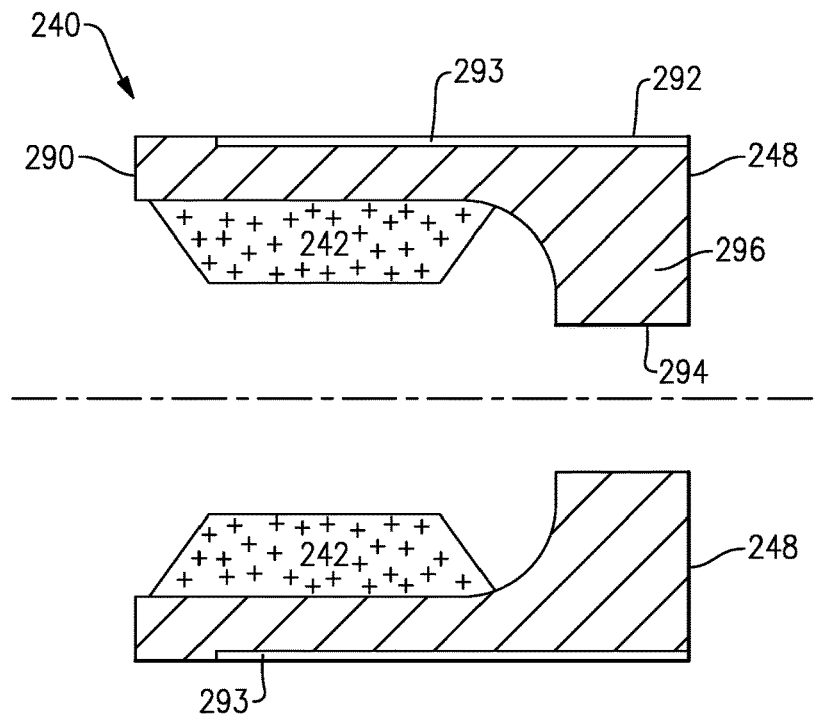
FIG. 3A is a cross sectional side view of a variable positioner.
Figure 3B:
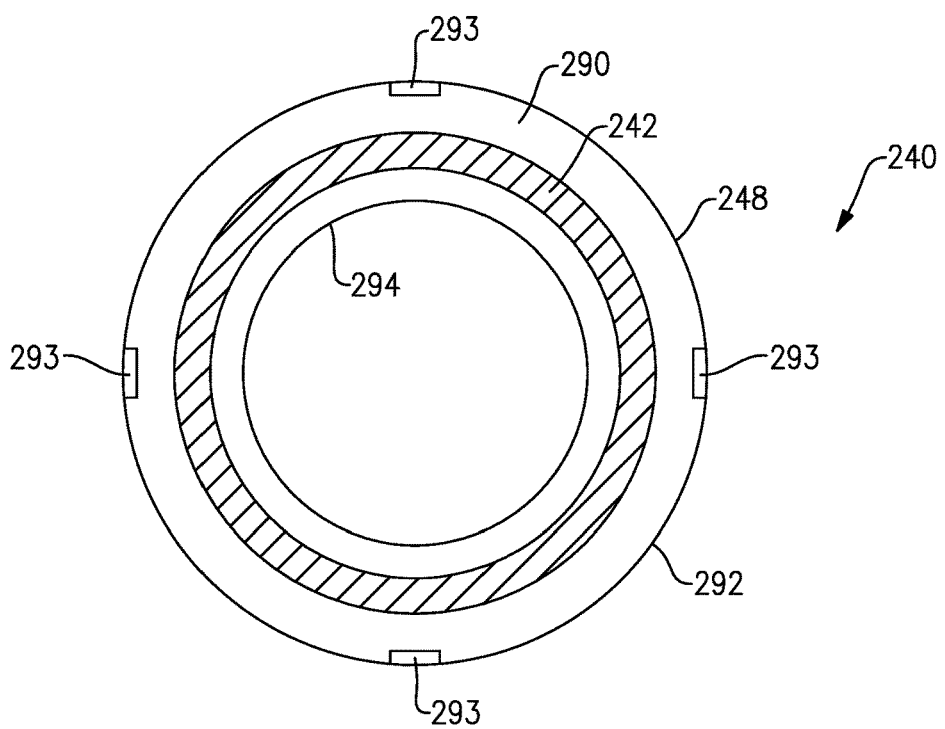
FIG. 3B is an axial end view of the variable positioner of FIG. 3A.

FIG. 3A illustrates a cross sectional view of a variable positioner 240. Similarly, FIG. 3B illustrates an axial end view of the variable positioner 240 of FIG. 3A. In the illustrated examples, the variable positioner 240 includes a cylindrical primary body section 296, with a first axial end surface 248 and a second axial end surface 290 opposite the first axial end surface 248 and a through hole protruding through the variable positioner 240. The through hole is axially aligned with the axis defined by the variable positioner. In a typical example, the first axial end surface 248 is positioned aft ward, relative to a corresponding shaft and serves as the contact surface for a corresponding rotor (such as the rotor 170 of FIG. 2).

Protruding radially inward from the primary body 296 of the variable positioner 240 is a threading 242. The threading 242 is complimentary to a threading feature of a corresponding shaft (such as the low turbine shaft 74 of FIG. 1), and allows the variable positioner to be moved axially along the shaft when rotated relative to the shaft body. Similarly, the threading 242 prevents the variable positioner from shifting axially relative to the shaft body when the variable positioner 240 is not being rotated.

A radially outward surface 292 of the variable positioner 240, includes multiple intrusions 293. Each of the intrusions 293 forms a slot that is operable to receive an anti-rotation feature of a rotor positioned axially by the variable positioner 240. In the illustrated example, the intrusions 293 extend a partial axial length of the variable positioner. In alternate examples, the intrusions 293 can extend the full axial length. As seen in FIG. 3B, the example variable positioner 240 includes four anti-rotation slots 293 disposed evenly about the exterior surface 292 of the variable positioner 240. Alternate examples can use more or fewer anti-rotation slots 293 depending on the particular needs of a given engine.

The illustrated example variable positioner 240 includes a radially inward contact surface 294 that nearly contacts the shaft about which the variable positioner is disposed, thereby centering the variable positioner, and increasing the radial height of the shoulder surface 248 that interfaces with the corresponding rotor. Alternate example variable positioners can have the opening defined by the surface 294 be radially larger than the outer diameter of the shaft, thereby allowing the variable positioner 240 to be easily disposed about the shaft.

While the example variable positioner 240 of FIGS. 3A and 3B is illustrated as a cylindrical ring, it is understood that other three dimensional shapes including a basic cylindrical body can be utilized to the same effect.

While the above description is written towards a three-spool gas turbine engine architecture, it will be understood by one of skill in the art that the illustrated shaft design and variable positioner can be adapted to any machine, including two-spool turbo machines, and still fall within the above disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section having at least a first compressor portion and a second compressor portion;
a combustor fluidly connected to the compressor section;
a turbine section fluidly connected to the combustor, the turbine section having at least a first turbine portion and a second turbine portion;
a first shaft connecting the first compressor portion and the first turbine portion;
a second shaft connecting the second compressor portion and the second turbine portion, wherein the second shaft is at least partially disposed within the first shaft, and wherein the second shaft includes a radially protruding threading portion and a shaft spline aft of the radially protruding threading portion; and
a variable positioner disposed about said second shaft, wherein the variable positioner includes a radially inward facing threading section, and wherein said radially inward facing threading section of said variable positioner interfaces with said radially protruding threading portion of said second shaft.

2. The gas turbine engine of claim 1, wherein the variable positioner is a cylindrical component defining a radially outward facing surface and a first and second axial end surface.

3. The gas turbine engine of claim 2, wherein at least one of the first and second axial end surface of the variable positioner is an interface shoulder, and wherein the interface shoulder interfaces with an interface surface of a rotating component, thereby maintaining said rotating component in position axially, relative to at least one static hardware component of the gas turbine engine.

4. The gas turbine engine of claim 3, wherein the interface shoulder is an aft end of the variable positioner.

5. The gas turbine engine of claim 2, wherein said variable positioner further comprises at least one anti-rotation slot positioned on said radially outward facing surface, and wherein said at least one anti-rotation slot interfaces with an anti-rotation feature of said rotor, thereby preventing rotation of the variable positioner relative to the second shaft.

6. The gas turbine engine of claim 5, wherein said at least one anti-rotation slot is loose fit with said at least one anti-rotation feature such that torque is transferred between said rotor and said second shaft at a spline instead of at said anti-rotation feature.

7. The gas turbine engine of claim 1, further comprising a rotor having an interface surface contacting a surface of said variable positioner;
the rotor including a rotor spline; and
the rotor spline and the shaft spline are interfaced together allowing the transfer of torque between the shaft and the rotor.

8. The gas turbine engine of claim 7, wherein
said variable positioner includes at least one anti-rotation slot and said rotor includes at least one corresponding anti-rotation feature; and
the at least one anti-rotation slot and the at least one corresponding anti-rotation feature are interfaced to form an anti-rotation assembly.

9. The gas turbine engine of claim 1, wherein a clearance between an outer diameter of said second shaft and an inner diameter of said first shaft defines an outer diameter clearance to the second shaft.

10. The gas turbine engine of claim 9, wherein said radially protruding threading portion has a radial height, and wherein said radial height is less than said outer diameter clearance of the second shaft.

11. The gas turbine engine of claim 1, further comprising a power turbine section in fluid communication with the second turbine section and an output shaft, wherein the power turbine section is connected to the output shaft via a third shaft, and wherein the third shaft is disposed at least partially within the second shaft.

12. A variable positioner for a gas turbine engine comprising:
a body portion having a cylindrical component;
an axially aligned through hole in said body portion;
a threading protruding radially inward from an inner surface of said axially aligned through hole;
and a first axial end defining an interface surface for interfacing with a rotor arm, the first axial end being an aft end; and
wherein said body portion further defines a radially outer surface, and wherein said radially outer surface includes at least one anti-rotation slot, and wherein said at least one anti-rotation slot protrudes radially from said radially outer surface.

13. The variable positioner of claim 12, wherein said at least one anti-rotation slot intrudes radially into said variable positioner.

14. The variable positioner of claim 12, wherein said at least one anti-rotation slot protrudes radially from said variable positioner.

15. The variable positioner of claim 12, wherein said at least one anti-rotation slot includes a plurality of anti-rotation slots disposed about said radially outer surface.

16. The variable positioner of claim 15, wherein said plurality of anti-rotation slots are disposed evenly circumferentially about said radially outer surface.

17. A method of maintaining an axial position of a rotor, relative to at least one static engine component, in a gas turbine engine comprising:
  disposing a variable positioner about a shaft, such that a radially inward facing threading of said variable positioner interfaces with a radially outward facing threading of said shaft;
  rotating said variable positioner, thereby shifting the variable positioner axially along said shaft, until an interface surface of said variable positioner is in a desired position;
  interfacing a rotor with said interface surface of said variable positioner, thereby maintaining said rotor in an axial position relative to said shaft; and
  interfacing a rotor spline portion with a shaft spline portion aft of the variable positioner, thereby facilitating transfer of torque between the rotor and the shaft at a spline without incurring a transfer of torque between the rotor and the shaft at the variable positioner, and interfacing an anti-rotation feature of said rotor with an anti-rotation slot of said variable positioner, thereby preventing rotation of said variable positioner relative to said shaft, wherein the anti-rotation slot protrudes from a radially outer surface of said variable positioner.

18. The method of claim 17, further comprising interfacing an anti-rotation feature of said rotor with an anti-rotation slot of said variable positioner, thereby preventing rotation of said variable positioner relative to said shaft.

* * * * *